Dec. 30, 1930.   M. W. FARNHAM   1,786,837
MOLDING MACHINE
Filed June 8, 1929   4 Sheets-Sheet 1
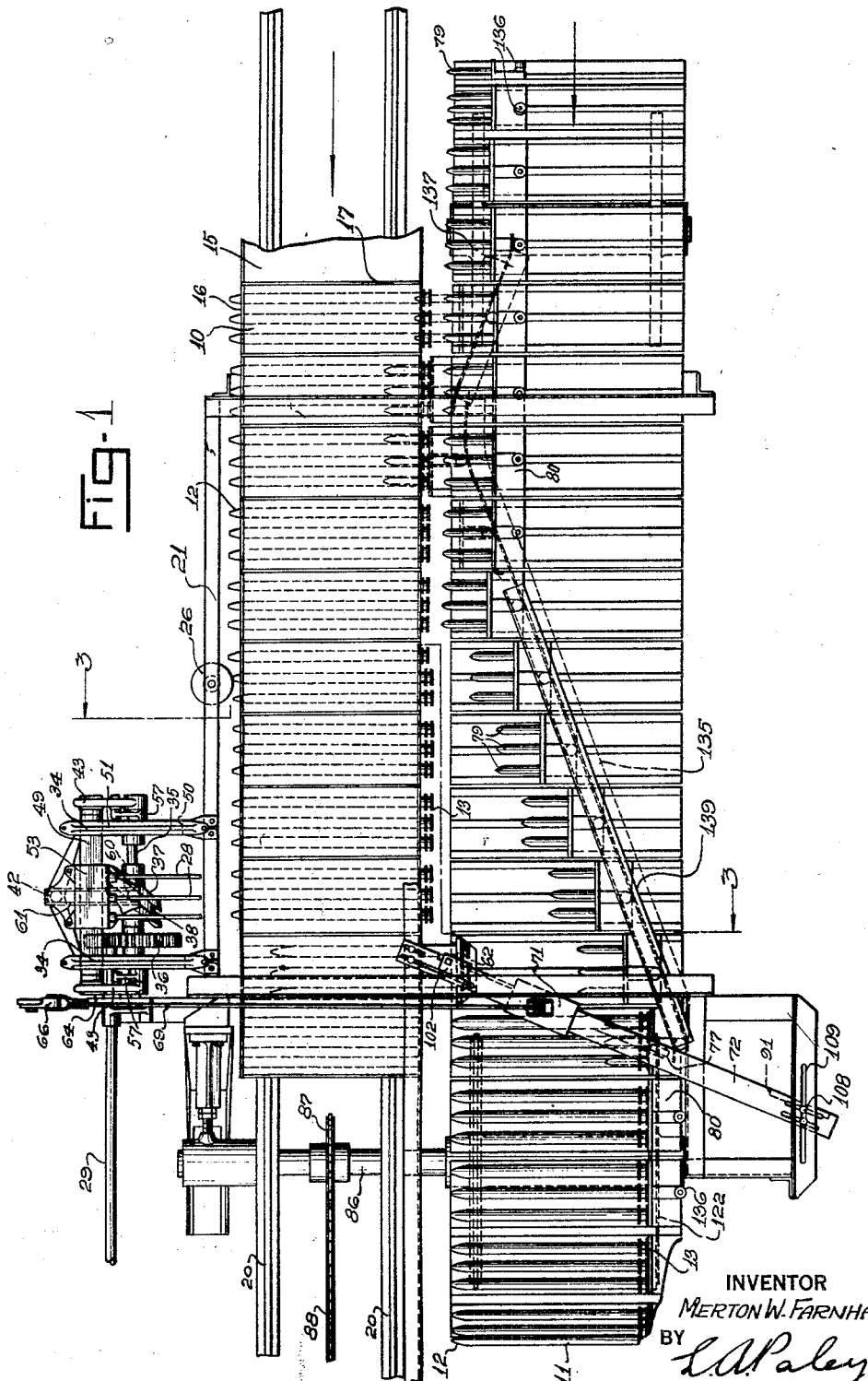
INVENTOR
MERTON W. FARNHAM.
BY
L. A. Paley
ATTORNEY

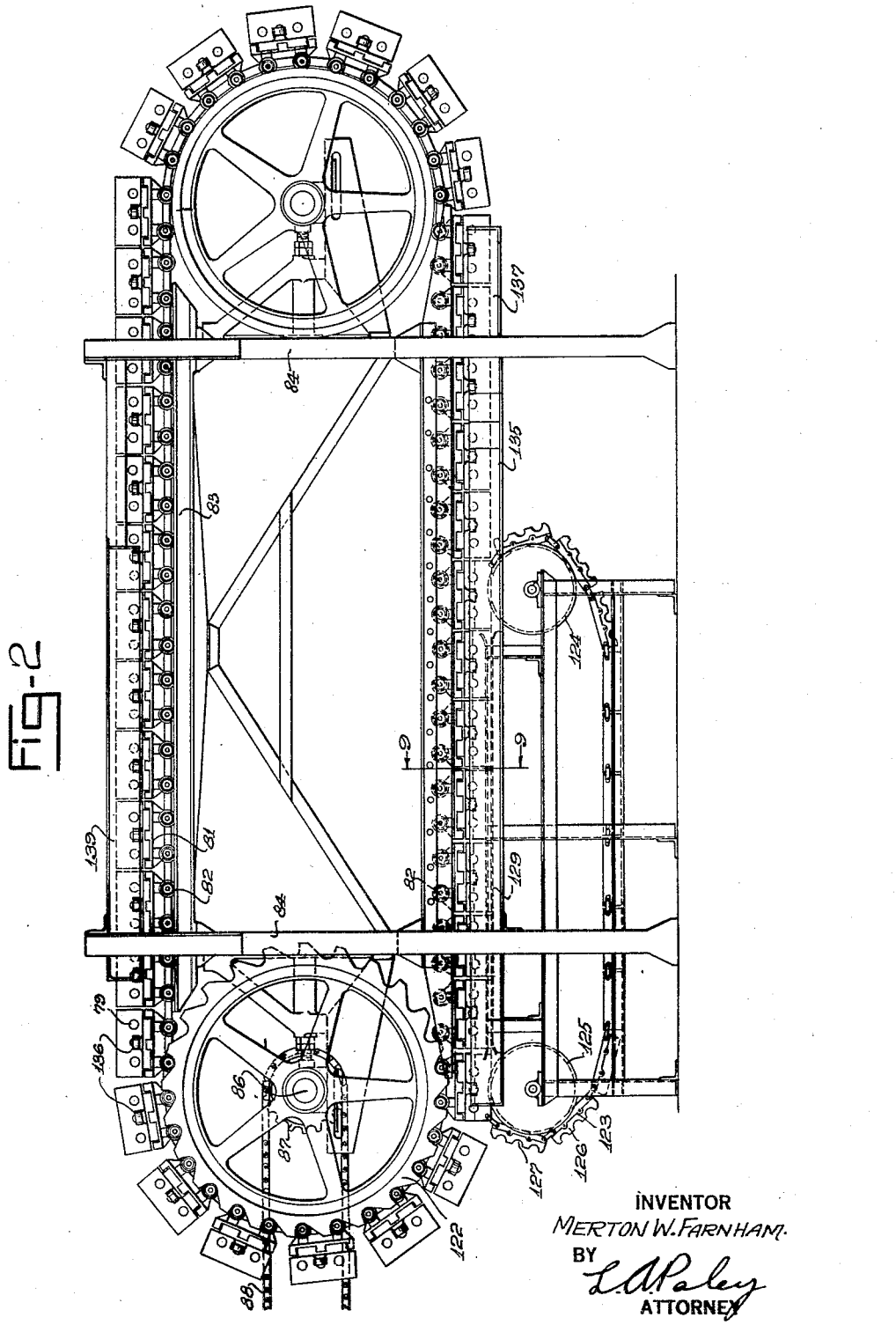

Dec. 30, 1930. M. W. FARNHAM 1,786,837
MOLDING MACHINE
Filed June 8, 1929 4 Sheets-Sheet 3
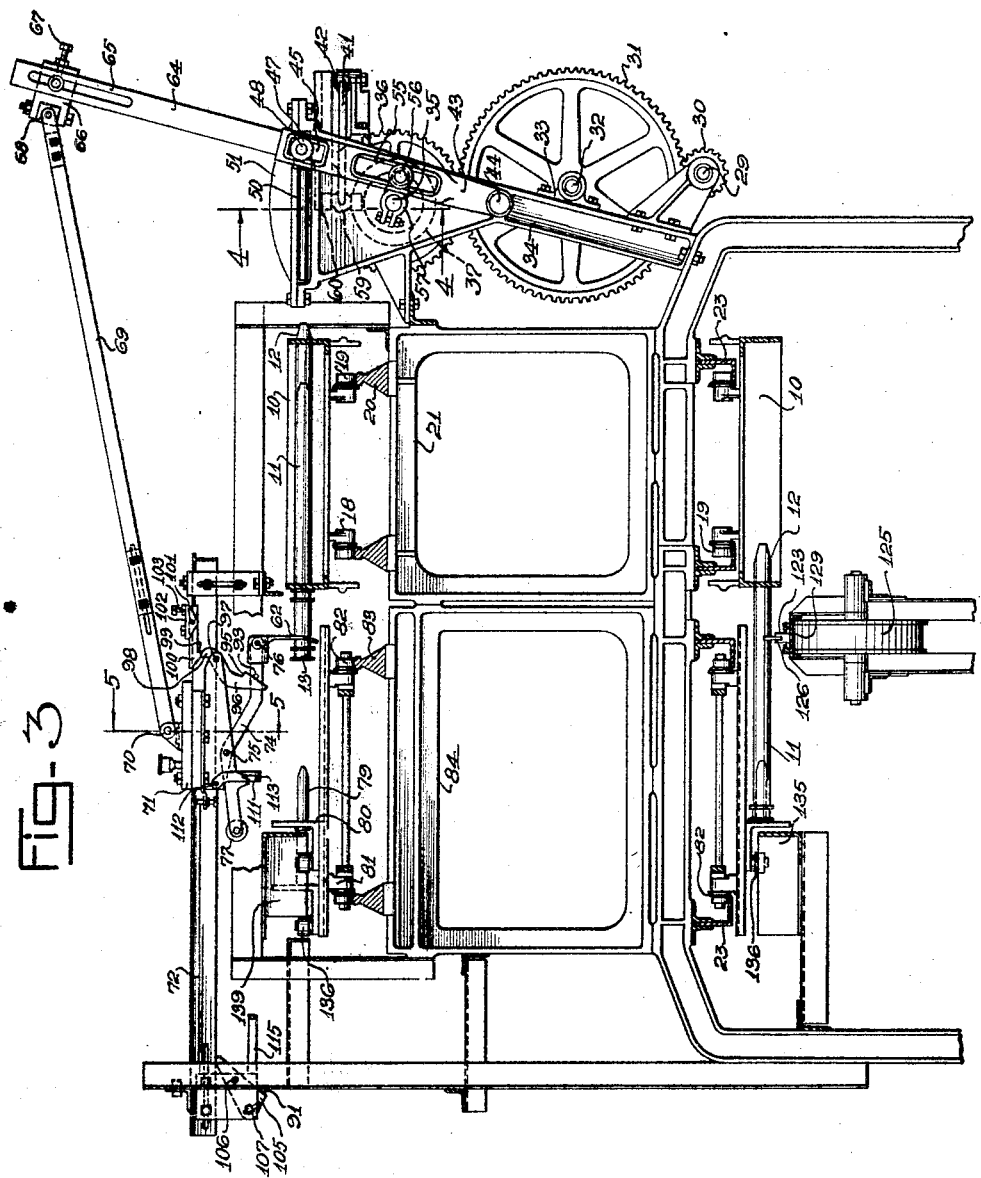
INVENTOR
MERTON W. FARNHAM.
BY
*L. A. Paley*
ATTORNEY Dec. 30, 1930.     M. W. FARNHAM     1,786,837
MOLDING MACHINE
Filed June 8, 1929      4 Sheets-Sheet 4
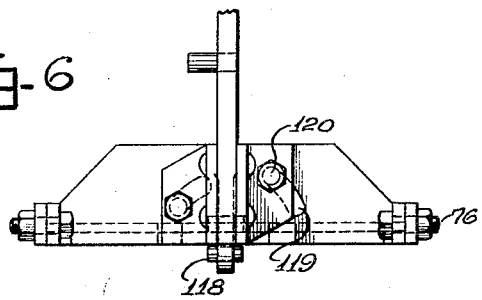
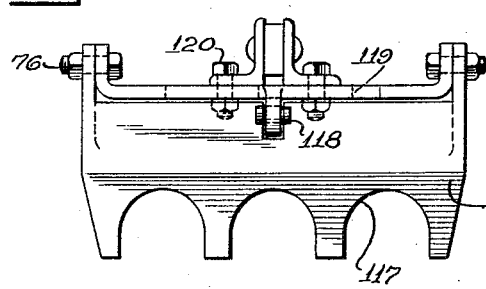
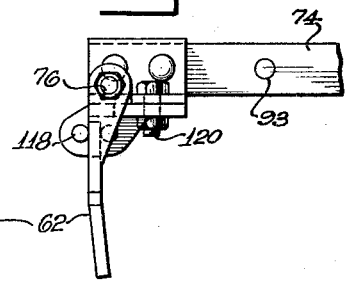
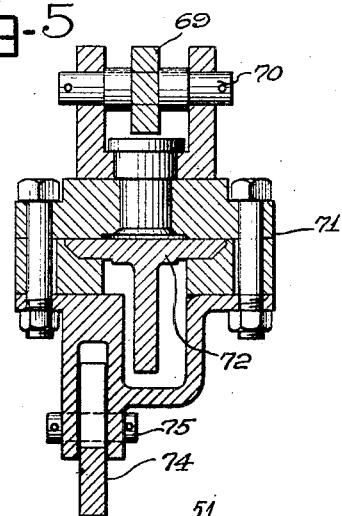
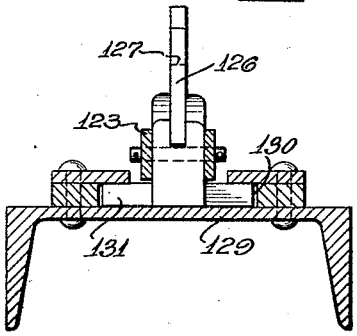
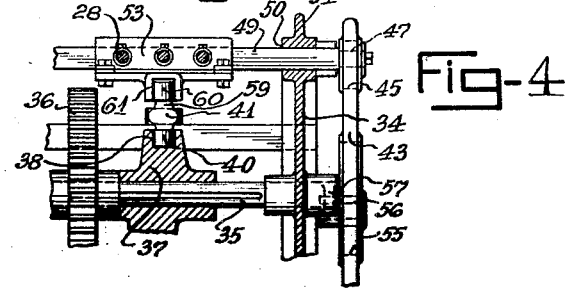
INVENTOR
MERTON W. FARNHAM.
BY
L. A. Paley
ATTORNEY Patented Dec. 30, 1930

1,786,837

UNITED STATES PATENT OFFICE

MERTON W. FARNHAM, OF BATAVIA, NEW YORK, ASSIGNOR TO UNITED STATES GYPSUM COMPANY, OF CHICAGO, ILLINOIS, A CORPORATION OF ILLINOIS

MOLDING MACHINE

Application filed June 8, 1929. Serial No. 369,368.

This invention relates to a molding machine for building blocks or other molded articles and has reference more particularly to mechanism for manipulating the core poles of the molds of the molding machine.

In the manufacture of building blocks from cementitious material, such as gypsum, it is the practice to mold these blocks with core holes extending longitudinally therethrough, these core holes being formed by core poles which must be withdrawn from the block after the setting of the cementitious material. It is important that these core poles be properly withdrawn to avoid cracking the blocks due to lateral strain placed on the rather fragile gypsum material.

An object of this invention, therefore, is to provide a mechanism for withdrawing and otherwise manipulating the core poles from the molds of the molding machine so that the building blocks will not be cracked when the core poles are withdrawn.

Another object of the invention is to provide a mechanism for manipulating the core poles of a molding machine which will be fool-proof, automatic and inexpensive to manufacture; also to improve molding machines in other respects hereinafter specified and claimed.

Reference is to be had to the accompanying drawings forming a part of this specification, in which Fig. 1 is a fragmentary plan view of the molding machine and core pole mechanism, Fig. 2 is an elevation of the core pole mechanism, Fig. 3 is a transverse sectional view through the molding machine and core pole mechanism taken on the line 3—3 of Fig. 1, Fig. 4 is a transverse sectional elevation through the ejecting mechanism taken on the line 4—4 of Fig. 3, Fig. 5 is a sectional elevation through the pole ejecting mechanism taken on the line 5—5 of Fig. 3, Figs. 6, 7 and 8 are fragmentary front elevation and side elevation views respectively, of the rake for removing the poles from the molds, and Fig. 9 is a sectional elevation through the pole-supporting conveyor.

The mechanism of the present invention is designed to be used in connection with a molding machine of the general type as that shown in the patent to Birdsey and Henning, 1,116,669 and the present invention is also an improvement upon the device shown in the patent to Henning, 1,208,557. In the molding machine described in those two patents, the cementitious material, such as gypsum, is poured in a wet state into the molds at one end of the machine, and as the molds travel to the opposite end of the machine, the cementitious material sets to solid form so as to form tiles 10 which are rectangular in cross section and of considerable length, said tiles being provided with longitudinal core holes which serve to reduce the amount of material used for each tile, and to also increase the insulation value of the tile. In the present invention, these core holes are formed by core poles 11 each of which is provided at one end with a pointed section 12, and at the other end with a collar 13 which is engaged by the pulling mechanism to be hereinafter described.

The molding machine proper may be of any desired construction and for the purpose of illustration, flat, boxlike molds 15 are shown which have end plates 16, these being usually hinged to the bottom of the mold so as to swing outwardly and release the block after the core poles are withdrawn. The core poles pass through suitable openings in the mold end 16, so that said mold ends serve to support the core poles when the cementitious material is poured into the molds and during the setting thereof. A single, hingedly connected wall 17 may separate one mold from the adjoining one, and these walls 17 are usually secured to the conveyor 18 upon which the molds are secured so that as the molds pass around the end sprocket wheel of the molding machine, these intervening walls 17 break away from the building blocks so as to permit their ready removal from the molds. The conveyor 18 is provided with suitable rollers 19 which move upon tracks 20 supported upon suitable framework 21 for the machine. Angle tracks 23 are supported on the lower side of framework 21 so as to support the molds as they return along the lower reach of the machine.

Owing to the fact that gypsum adheres quite strongly to metal surfaces in contact with it during the casting, it is desirable that the core poles be pushed or pulled out of the block or tile in stages so as to avoid breaking the blocks. For this purpose, the ends 12 of the core poles extend beyond the mold ends 16 and are engaged by a roller 26 which is rotatably mounted on the framework 21 of the machine so as to lie in the path of travel of said pole ends 12. As seen in Fig. 1, this roller 26 contacts with the pole ends 12 and loosens same from the gypsum blocks by pushing said poles outwardly a short distance. As the molds then move along, ejecting pins 28 corresponding in number to the number of core poles in each mold, are advanced so as to engage the ends of the core poles and push same farther out of the molds.

The mechanism for operating the ejecting pins 28 consists in a drive shaft 29 which is rotatably mounted longitudinally of the machine, a spur pinion 30 being secured to said drive shaft and meshing with a spur gear 31. The spur gear 31 is secured to a counter shaft 32 which is rotatably supported in bearings 33 secured to a suitable framework 34 attached to the main frame of the machine. A shaft 35 is also rotatably supported by the framework 34 and a gear 36 meshes with a gear 31 so as to cause the rotation of said shaft 35. A cam 37 is secured to the shaft 35, said cam being provided with a circumferential cam groove 38 which is substantially elliptical in shape and is engaged by a roller 40 which is secured to one of the short legs of a T-shaped arm 41. The opposite end of arm 41 is pivotally secured by pin 42 to the framework 34 of the machine.

A lever 43 is pivotally secured by pin 44 to the framework 34, said lever being provided with a slot 45 which slidably engages a slide 47, the latter being rotatably mounted upon an outstanding trunnion 48 secured to a slide member 49 which is preferably rectangular in shape in cross section. The slide 49 operates in suitable slideways 50 formed in the upper ends of framework members 34, said slideways being covered by cover members 51, secured to said framework. A suitable bracket 53 is slidably mounted on the slide member 49 and the rear end of pins 28 are rigidly secured to said bracket. A second slideway 55 is formed in the lever 43 and a roller 56 engages in said slideway, said roller being secured to a crank arm 57 secured to the shaft 35. Thus as shaft 35 is rotated, lever 43 is rocked and pins 28 are reciprocated.

The forward end of arm 41 is also provided with an upper cross leg 59 and a roller 60 is rotatably mounted upon said cross arm 59 and engages in a slideway 61 formed in the bottom of bracket 53. Thus when the levers 43 are rocked about pins 44 by crank 57, cam 37 causes carriage 53 and pins 28 to follow the molds at substantially the same speed and at the same time said ejecting pins 28 are moved forwardly into engagment with the ends 12 of the core poles by the forward movement of slide 49 due to the locking of levers 43. The core poles are pushed out by ejecting pins 28 a sufficient distance so that a rake 62 may engage the collars 13 on the ends of the core poles pulling same out the remaining distance into complete disengagement with the molds and blocks.

It is desirable that the core poles be withdrawn by the rake 62 with a rapid motion, so that no strains will be put upon the building blocks which would tend to crack them due to wear or mis-alignment of the core poles. For this purpose, an extended lever arm 64 is rigidly attached to one of the lever arms 43 so as to rock therewith. A slot 65 is formed in the outer end of lever 64 and the universal joint bracket 66 is adjustably secured in such slot by means of a set screw 67. A universal joint 68 is secured to the bracket 66 and a connecting rod 69 pivotally connects said universal joint with a pivot pin 70 secured on a slide carriage 71. The carirage 71 is slidingly supported upon a beam 72 which may be T-shaped in cross section as seen in Figure 5, with the carriage enclosing the oustanding flanges thereon.

A lever 74 is pivotally secured to the lower portion of carriage 71 by means of pivot pin 75, and the rake 62 is pivotally supported for limited movement upon the outer end of one arm of lever 74 by means of a pin 76. The opposite arm of lever 74 is provided with a counter-weight and roller 77 which balances the weight of the rake 62. The slide bar 72 is arranged at an acute angle to the longitudinal axis molding machine, said angle being so adjusted that as the bar 69 pushes carriage 71 and rake 62 outwardly carrying the core bars 11, the rake moves ahead with the molds at substantially the same speed so as to avoid any cracking of the building blocks due to abnormal strains placed thereon. The core poles 11 are preferably made hollow and when the rake 62 withdraws same, they telescope over pilot pins 79 which are rigidly secured to brackets 80, the latter in turn being mounted securely to a conveyor 81. Rollers 82 are provided upon the conveyor 81, said rollers traveling along tracks 83 which are supported upon suitable framework 84. The sprocket wheels for supporting and driving the conveyor 18 and 19 and the conveyor 81, are preferably secured to a single shaft 86 at the delivery end of the machine, said shaft being provided with a sprocket wheel 87 connected by a chain 88 to any suitable source of power, such as an electric motor not shown. Thus, the mold conveyor and the core pole conveyor are caused to move at exactly the same rate of speed.

As the core poles 11 move to their completely withdrawn position under the action of rake 62, roller 77 engages a sloping cam surface 91 secured to the framework of the machine so that lever 74 is moved in a counter clockwise direction, as seen in Fig. 3. When the roller 77 engages said cam surface 91, the rake 62 is disconnected from core poles 11 and causes the lever 74 to be temporarily restrained in the inoperative position owing to the fact that a pin 93 on lever 74 engages over a shoulder 95 on a catch lever 96. The lever 96 is pivotally supported by means of a pin 97 on the carriage 71, and the upper end of said lever is provided with a catch 98 which is arranged to pass under a catch shoulder 99 on a lever 100 during the return stroke of carriage 71. The lever 100 is pivotally secured by a pivot pin 101 to a bracket 102, the position of the catch shoulder 99 being adjusted by means of an adjusting screw 103 on said bracket 102 so as to lie in proper relation to the catch 98. When the carriage 71 just begins its motion to withdraw the core poles 11, the catch 98 engages the catch shoulder 99 so as to disengage catch shoulder 95 from pin 93 and release the lever 74, thus causing said lever 72 to fall downwardly until rake 62 engages collars 13 on the core poles 11 and withdraws said core poles. The cam surface 91 is formed upon a cam 105 which is pivotally secured to supporting framework by means of a pivot pin 106. However, said cam 105 is rigidly locked in position by means of a bolt 107 so that the angle of the cam surface 91 can be accurately adjusted to give the proper results. Furthermore, the inclination of the beam 72 can be accurately adjusted by means of bolts 108 which are secured in adjusting slot 109 formed in the framework of the machine.

In order to prevent the rake 62 from being accidently disconnected from the core poles 11 during the withdrawing movement, a safety lever 111 is pivotally secured to carriage 71 by means of pin 112. Lever 111 has a pin 113 rigidly secured thereto, said pin being adapted to engage behind a catch shoulder formed on the lever 74 during the withdrawing movement. Just before the roller 77 engages the cam surface 91, the lever 111 engages a bracket 115 rigidly secured to the framework of the machine, so as to disconnect the pin 113 from the catch shoulder formed on lever 74 and thus permit lever 74 to move in a counter-clockwise direction to disengage the rake 62 from the core poles. The rake 62 is preferably formed with a sloping surface having openings 117 which are three in number, as shown, or the same number of core poles used for each building block. The end of the lever 74 is provided with a limit pin 118 rigidly secured thereto, which limits the pivotal movement of rake 62 about pin 76 in one direction, but permits said rake to swing into vertical position at all times during movement of lever 74. Slots 119 and bolts 120 are provided for securing the rake 62 to the end of lever 74, so that the correct contact of the rake 62 with the core pole collars 13 is obtained.

As the conveyor 81 moves downwardly after the core poles 11 have been placed upon the pilot pins 79, said conveyor passes around sprocket wheels 122. When conveyor 81 passes into the lower reach of the chain, another conveyor 123 which moves around rotatably mounted idler sprockets 124 and 125, engages the core poles 11 by means of shoes 126, having recesses 127 for supporting said core poles. The upper reach of conveyor 123 passes along supporting framework 129 which has slide-ways 130 formed on its upper surface for engaging suitable shoulders 131 formed on conveyor 123, so as to accurately position said conveyors and to support the core poles during their travel.

In order to restore the core poles 11 to their operative position in the molds after the removal of the building blocks at the delivery end of the machine, a cam track 135 is provided which engages a roller 136 pivotally secured to each of the pilot pin brackets 80. This cam track 135 slopes at an inclination to the molding machine and gradually pushes the core poles back into position in the molds. The pilot pins 79 are then withdrawn from the core poles by the engagement of rollers 136 with a cam track 137 sloping in a direction opposite to that of cam track 135. When the pilot pin brackets 80 arrive at the upper reach of the conveyor 81, the rollers 136 engage on cam track 139 so as to withdraw said brackets 80 to the outside of conveyor 81 ready for a new application of the core poles upon the pilot pins 79.

In operation the molds carrying the core poles 11 are filled with the cementitious material and moved along in the direction of the arrow as shown in Fig. 1 until the ends of the core poles engage the roller 26 which loosens the core poles from the building block. The ends of the loosened core poles are next engaged by pins 28 which are secured to carriage 53. Levers 43 rocked by crank 57, move the carriage 53 ahead to cause the ends of pins 28 to contact with the ends of the core poles and at the same time cam 37 moves carriage 53 on slide 49 with a speed essentially equal to that of the molds.

The rake 62 now moves downwardly and engages the core poles behind collars 13 and carriage 71 is moved to the left as seen in Fig. 3 by lever 64 and bar 69 until roller 77 engages cam surface 91 so that safety lock 111 is engaged by bracket 115 which causes pin 113 to be disengaged from the corresponding shoulder on lever 74. The action of roller 77 on cam surface 91 causes lever 74 to move in a counter-clockwise direction until rake 62 has been disengaged from collar 13. By this time the core poles have been moved onto pilot pins 79 which are mounted upon bracket 80 secured to conveyor 81. Carriage 71 now moves to the right as seen in Fig. 3 until catch 98 engages behind shoulder 99 on lever 100 after which, movement of the carriage 71 to the left causes shoulder 95 on lever 96 to disengage from pin 93, thus permitting lever 74 to move downwardly carrying the rake 62 to engage with a set of core poles 11 and pull same outwardly from the block.

As the core poles move around into the lower reach of conveyor 81, the poles are supported in the middle by shoes 126 mounted upon conveyor 123. The rollers 136 on bracket 80 now engage cam slide 135 which moves the pilot pins 79 into proximity with the molds and also slides the core poles into position in said molds. Rollers 136 then engage cam slide 137 which withdraws the pilot pins from the core poles and the pilot pins then move into the upper reach of conveyor 81 until they engage cam slide 139 which again moves the pilot pins 79 outwardly to receive the core poles removed by rake 62.

While the foregoing description constitutes a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In a molding machine, a series of molds adapted to move in a continuous path and being also adapted to receive cementitious material so that said material is molded into building blocks, a core pole associated with a mold, means for loosening said core pole, and reciprocating means adapted to completely remove the core pole from said block.

2. In a molding machine, a series of molds adapted to move along the continuous path and form cementitious material into blocks, a core pole associated with a mold, means for loosening the core pole from said block, means for pushing on said core pole to cause further withdrawal of said core pole from said block, and means for pulling on said core pole to cause the complete removal of said core pole from said block.

3. In a molding machine, a series of molds adapted to move along a continuous path, a core pole associated with a mold, said mold being adapted to mold cementitious material into a block about said core pole, means for loosening said core pole from said block, reciprocating means adapted to accomplish the partial withdrawal of said core pole from said block, a second reciprocating means adapted to completely withdraw the core pole from the block, and means for causing the first and second reciprocating means to move in synchronism with the molds during the entire withdrawing operation.

4. In a molding machine, a series of molds adapted to move along a continuous path and form cementitious material into blocks, core members associated with each mold, a series of pilot pins adapted to move in synchronism with said molds, reciprocating means adapted to transfer said core members from said molds and blocks to said pilot pins during the movement of said molds, and means for supporting said core members during the movement of said core members with said pins.

5. In a molding machine, a series of molds adapted to move along a continuous path and to form cementitious material into blocks, core members associated with said molds, pushing and pulling means adapted to act on said core members so as to move the latter axially away from said molds, and supporting means adapted to support said core members in synchronized relation to the molds.

6. In a molding machine, a series of molds adapted to move in a continuous path and to form cementitious material into blocks, core members associated with said molds, roller means adapted to act on said core members to loosen the latter from said blocks, and reciprocating means adapted to cause axial movement of said core members away from said molds.

7. In a molding machine, a series of molds adapted to move along a continuous path and mold cementitious material into blocks, core members associated with said molds, reciprocating means adapted to act on said core members so as to move the latter axially away from said molds, and cam means adapted to cause said reciprocating means to move in synchronism with said molds while acting upon said core members.

8. In a molding machine, a series of molds adapted to move along a continuous path and form cementitious material into blocks, core members associated with said molds, means for partially removing said core members from said molds, a movable member adapted to engage said core members and completely withdraw said core members from said molds, and means for causing a forward movement of said members in synchronism with said molds when said movable member is connected to said core members.

9. In a molding machine, a series of molds adapted to move along a continuous path and form cementitious material into blocks, core members associated with said molds, a lever associated with said molds for actuating said core members, means for rocking said lever, ejecting pins actuated by said lever and adapted to move said core members axially away from said molds, and cam means adapted to cause the movement of said ejecting pins in synchronism with said molds when said pins are operating on said core members.

10. In a molding machine, a series of molds adapted to move along a continuous path and form cementitious material into blocks, core members associated with said molds, means for causing the partial removal of said core members from said molds, a lever, means for rocking said lever, a movable member adapted to engage said core members, and connecting means between said lever and said movable member adapted to cause a complete removal of said core members from said molds.

11. In a molding machine, a series of molds adapted to move along a continuous path and form cementitious material into blocks, core members associated with said molds, means for causing the partial removal of said core members from said molds, a slidably mounted carriage, a lever pivotally mounted on said carriage, means on said lever for engaging said core members and causing the complete removal of said core members from the molds when said carriage is reciprocated, and means for causing the reciprocation of said carriage.

12. In a molding machine, a series of molds adapted to move along a continuous path and to form cementitious material into blocks, core members associated with said molds, a carriage slidably mounted and engaging said molds, means for causing the reciprocation of said carriage, a movable member operatively connected to said carriage and adapted to engage said core members so as to move the latter axially away from said molds, and automatically releasable locking means adapted to prevent the accidental disconnection of said movable member from said core members.

13. In a molding machine, a series of molds adapted to move along a continuous path and form cementitious material into blocks, core members associated with said molds, a carriage mounted for reciprocating movement adjacent said molds, an operating member associated with said carriage, said operating member being adapted to engage said core members and move the latter axially away from said molds, and automatically releasable means adapted to hold said movable member out of contact with said core member during a portion of the travel of said carriage.

14. In a molding machine, a series of molds adapted to move along a continuous path and to form cementitious material into blocks, core members associated with said molds, a slide member arranged at an acute angle to the motion of said molds, a carriage slidably mounted on said slide member, means for reciprocating said carriage along said slide member so that said carriage is advanced in synchronism with the molds while said carriage is reciprocated, and a movable member associated with said carriage and adapted to engage said core members so as to move said core members axially out of said molds when said carriage is reciprocated.

MERTON W. FARNHAM.